US012407665B1

United States Patent
Daitch

(10) Patent No.: US 12,407,665 B1
(45) Date of Patent: Sep. 2, 2025

(54) SYSTEMS AND METHODS USING MULTIPLE PARTITIONS FOR AGGREGATED TRACKING OF WEB SERVICES

(71) Applicant: Amazon Technologies, Inc., Seattle, WA (US)

(72) Inventor: Nir Daitch, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 18/462,146

(22) Filed: Sep. 6, 2023

(51) Int. Cl.
*H04L 9/40* (2022.01)
(52) U.S. Cl.
CPC .................................. *H04L 63/08* (2013.01)
(58) Field of Classification Search
CPC ...................................................... H04L 63/08
See application file for complete search history.

(56) References Cited

U.S. PATENT DOCUMENTS 10,853,350 B1\* 12/2020 Sharifi Mehr ...... G06F 16/2365
2017/0359344 A1\* 12/2017 Kaal .................... H04L 63/0892

\* cited by examiner

*Primary Examiner* — Benjamin A Kaplan
(74) *Attorney, Agent, or Firm* — Eversheds Sutherland (US) LLP

(57) ABSTRACT

Systems and methods using multiple partitions for aggregated tracking of web services are provided. Particularly, a centralized system is provided that automatically obtains and presents aggregated information about the status of various web services. This information about the web services may be obtained by the centralized system periodically such that a user may access the centralized system to determine if one or more of the web services are currently experiencing an issue. Additionally, security credentials may be cached within multiple partitions. By partitioning the security credentials in cache, the system may separate when the security credentials are refreshed and when they are used. That is, rather than the system being required to access the security credentials from the source at which they are periodically refreshed every time the system accesses the information about the web services, the system may rather obtain the security credentials from the partitions in the cache.

20 Claims, 6 Drawing Sheets

SYSTEMS AND METHODS USING MULTIPLE PARTITIONS FOR AGGREGATED TRACKING OF WEB SERVICES

BACKGROUND

In some instances, it may be beneficial to have access to information regarding the status of various web services to determine and localize the impacts of issues with such services. However, there may be a number of challenges associated with tracking multiple web services. For example, the number of web services to track may change over time, the access to these services may need to be secure such that tokens may need to be refreshed frequently, and the frequency at which information about the web services is obtained may differ from the frequency at which security credentials are obtained.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

DETAILED DESCRIPTION

Figure 1:
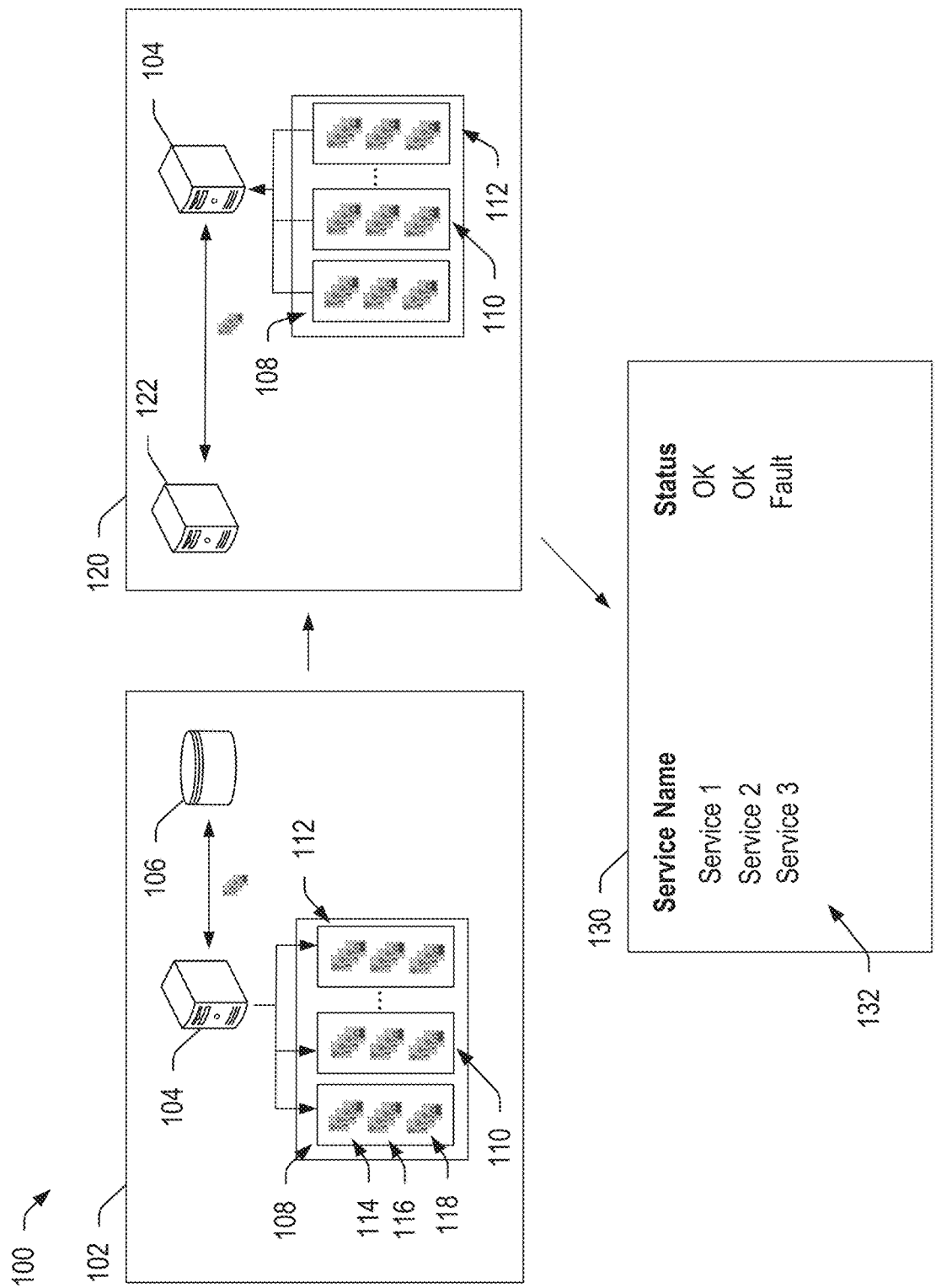
FIG. 1 depicts an example use case for using multiple partitions for aggregated tracking of web services in accordance with one or more example embodiments of the disclosure.

This disclosure relates to, among other things, systems and methods using multiple partitions for aggregated tracking of web services. Particularly, a centralized system is provided that automatically obtains and presents aggregated information about the status of various web services. An entity may provide a cloud (e.g., Internet-based) computing platform including various web services that may be used by other entities. Non-limiting examples of such web services may include infrastructure-as-a-service (IaaS), platform-as-a-service (PaaS), and packaged-software-as-a-service (SaaS), such as computing, storage, data management, networking, development tools, management, monitoring, security, governance, analytics, artificial intelligence, mobile development, messages and notification, and/or any other types of web services. Given the vast number of such services that may be made available for use by the other entities, having status information for the web services that is centralized and aggregated may be beneficial to effectively track and troubleshoot the status of the provided services.

This information about the web services may be periodically obtained by the centralized system such that a user may access the centralized system (for example through a user interface presented on a device) to determine if one or more of the web services are currently experiencing an issue (for example, the one or more web services are not functioning as intended). In some instances, it may be desired for the system to be configured to access the information about the web services at a high frequency (for example, multiple times per minute). However, to obtain this information, the system may need to access security credentials, and it may often take a non-negligible amount of time to access the security credentials for an aggregate of web services (for example, multiple minutes).

To address these challenges associated with automatically obtaining information about an aggregate of web services that require security credentials, the security credentials may be cached within multiple partitions. A cache may be a high-speed data storage layer that stores a subset of data, typically transient in nature, so that future requests for that data are served up faster than is possible by accessing the data's primary storage location. By partitioning the security credentials in cache, the system may separate when the security credentials are refreshed and when they are used. That is, rather than the system being required to access the security credentials from the source at which they are periodically refreshed every time the system accesses the information about the web services, the system may rather obtain the security credentials from the partitions in the cache. Then, when the security credentials are refreshed and the security credentials stored within the cache need to be updated, the system may obtain the updated security credentials from the original source and replace the existing security credentials in the cache.

Given that the number of web services that are automatically monitored by the system may be dynamic, each of the partitions may be configured to store credentials associated with multiple web services. For example, in one or more embodiments, a single partition may be configured to store credentials for 40 web services (however, this number is merely exemplary). This allows the system to quickly scale with the number of monitored services.

The systems and methods described herein provide a number of technical benefits over existing systems. For example, the system is centralized and provides information about an aggregate of web services, such that the system is scalable for a dynamically changing number of web services. The system is configured to obtain information about web services at a high frequency (for example, multiple times per minute) while managing security credentials that may otherwise take multiple minutes to obtain for an aggregate of web services.

As yet another example of a technical benefit, the system may be automated and may not require manual intervention from a user. As described with respect to at least FIGS. 3-4, the centralized system may include artificial intelligence that may automatically detect when an alarm is established for a given web service by a user (or automatically by the system). For example, one or more alarms may be established for tracking various metrics associated with a web service against certain conditions, such as threshold values, for example. When such alarms are established, they may automatically be identified as being established by the artificial intelligence and the associated web service may then begin to be monitored by the centralized system. The artificial intelligence may also detect when the alarms are deleted from the web service, and monitoring of the web service may then be automatically disabled.

As yet another example of a technical benefit, when storing the security credentials in the cache, the system may randomize the distribution of the credentials throughout each partition. That is, rather than storing all credentials for one service (or credentials for related services) within a single partition, such credentials may be distributed across multiple partitions. In this manner, if a fault occurs with one of the partitions, the system may not necessarily lose access to security credentials for an entire web service or collection of related web services.

Further, if a failure occurs in the original source from which the security credentials are obtained (e.g., the source from the which the security credentials are obtained to be added to the cache) the cached security credentials may instead be used (or may be re-used) to access the web services. This provides for a system that is even more fault tolerant to network issues or otherwise outages in the security credentials source. The security credentials may be used to access the web services on a per-service basis, for example, which provides the system with resilience to full or partial failures.

Turning to the figures, FIG. 1 depicts an example use case 100 for using multiple partitions for aggregated tracking of web services. The use case 100 begins with scene 102, which shows centralized computing device 104 (which may be the same as computing device 204 shown in FIG. 2) receiving one or more security credentials from a database 106 that maintains the security credentials (this is exemplary and the security credentials may also be maintained at any other type of system and/or device). The security credentials may be credentials used to access status information relating to one or more web services.

Upon receiving the security credentials from the database 106, the centralized computing device 104 may store the credentials within multiple partitions in cache of the centralized computing device 104. For example, the scene 102 shows first partition 108, second partition 110, and third partition 112, however, any other number of partitions may also be used. Individual partitions may store multiple sets of security credentials. For example, the first partition 108 is shown as including first security credentials 114, second security credentials 116, and third security credentials 118.

In one or more embodiments, the centralized computing device 104 may randomize the partitions into which the security credentials are stored, rather than providing security credentials for a single web service or multiple related web services. This mitigates the impact of a fault of a single partition on the ability of the centralized computing device 104 to obtain status information about related web services (described further in scene 120). That is, if a fault occurs with one of the partitions, the centralized computing device 104 may not necessarily lose access to security credentials for an entire web service or collection of related web services. However, the centralized computing device 104 is not necessarily limited to the random assignment of security credentials to the partitions.

Following scene 102, scene 120 shows the centralized computing device 104 using the security credentials stored within the cache to obtain status information about the one or more web services from one or more computing devices associated with the web services (for example, computing device 122). For example, security credentials associated with a first web service may be stored within the first partition 108 and security credentials associated with a second web service may be stored within the second partition 110. The centralized computing device 104 may obtain the security credentials associated with the first web service from the first partition 108 and security credentials associated with a second web service from the second partition 110, and may use these credentials to obtain status information about the first web service and second web service from the computing device 122. The computing device 122 may be a device that hosts the first web service and second web service, for example.

Given that the security credentials are stored in the cache, the centralized computing device 104 may be configured to obtain the security credentials at a faster rate than if the centralized computing device 104 were required to obtain the security credentials from the database 106 every time the centralized computing device 104 obtains status information from the computing device 122. That is, it may normally take several minutes to obtain an aggregated group of security credentials for various web services from the database 106. However, it may be desirable to obtain status information about the web services from the computing device 122 at a faster rate (such as several times per minute). By storing the security credentials in the cache, the centralized computing device 104 is able to obtain status information about the web services at this faster rate while maintaining the security of the web services.

The security credentials may also periodically be updated within the database 106. Thus, to ensure that the correct security credentials are maintained in the cache, the centralized computing device 104 may periodically obtain updated security credentials from the database 106. The centralized computing device 104 may then update the security credentials within the cache such that the updated security credentials may then be used to obtain the status information from the computing device 122.

Finally, scene 130 shows a simplified version of a user interface 132 that may be presented as a result of the operations performed within scenes 102 and 120. The simplified user interface 132 exemplified that multiple web services may be presented to a user along with status information associated with the various web services. For example, the user interface 132 may indicate that a web service is "ok" and properly functioning or that there is a fault associated with a given web service. Additional information about this status information is provided with respect to at least FIG. 2. The user interface 132 is merely exemplary and the information may also be presented in any other suitable format and may include any other level of granularity of information.

Figure 2:
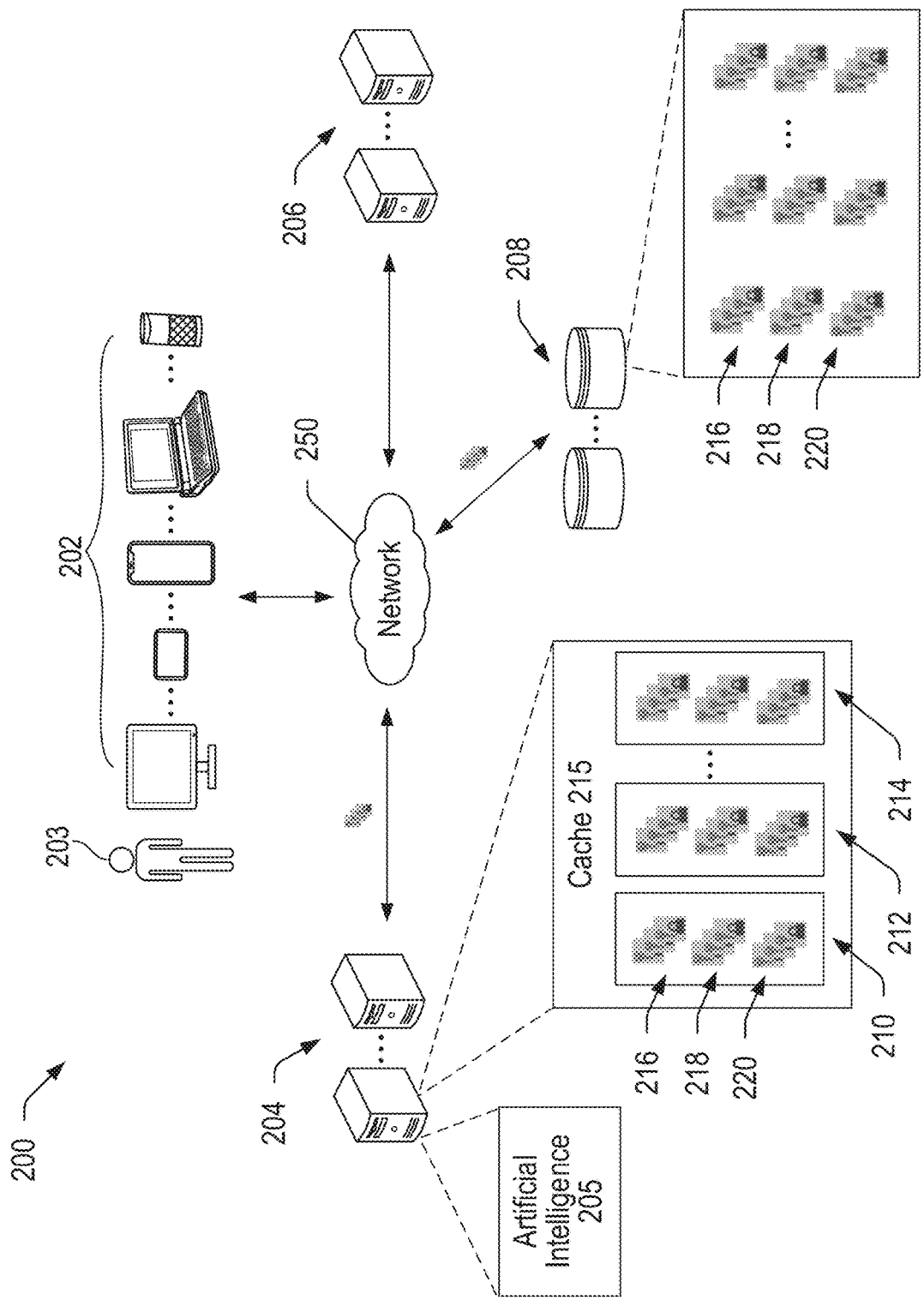
FIG. 2 depicts an example system in accordance with one or more example embodiments of the disclosure.

FIG. 2 shows an example system 200. In one or more embodiments, the system 200 may include one or more user devices 202 (which may be associated with one or more users 203), one or more computing devices 204 (which may be the same as or similar to centralized computing device 104) and 206 (which may be the same as or similar to computing device 122), and/or one or more databases 208 (which may be the same as or similar to database 106). However, these components of the system 200 are merely exemplary and are not intended to be limiting in any way. For simplicity, reference may be made hereinafter to a user device 202, computing device 204 and 206, database 208, etc., however, this is not intended to be limiting and may still refer to any number of such elements.

The user device 202 may be any type of device, such as a smartphone, desktop computer, laptop computer, tablet, and/or any other type of device. The user device 202 may allow the user 203 to view information that is obtained by the computing device 204 about the status of various web services (for example, web services hosted on the computing device 206). The user device 202 may include an application with a user interface (such as the user interface shown in scene 130 of FIG. 1) that allows the user 203 to view such information. For example, the user interface may indicate whether a particular web service is currently experiencing a fault or is operating as intended.

A first entity (for example, an entity that is associated with the computing device 204 and/or the computing device 206) may provide a cloud (e.g., Internet-based) computing platform including various web services that may be used by other entities. Non-limiting examples of such web services may include infrastructure as a service (IaaS), platform as a service (PaaS), and packaged software as a service (SaaS), such as computing, storage, data management, networking, development tools, management, monitoring, security, governance, analytics, artificial intelligence, mobile development, messages and notification, and/or any other types of services.

As a more detailed example, a specific type of artificial intelligence web service may include a fraud detection service that utilizes one or more machine learning model(s) to detect fraudulent online activity. This particular web service may be hosted by the first entity (such as via the computing device 206) providing the services on the cloud computing platform and may be accessed by a second entity that desires to use the web service to perform online fraud detection. As another detailed example, a storage web service may be provided by the first entity and a second entity may use the storage service to store various types of data on the cloud without being required to maintain its own storage (e.g., servers, etc.). These are merely examples of different types of web services that may be provided and are not intended to be limiting.

The computing device 204 may be the centralized computing device 104 depicted in the use case 100 of FIG. 1. That is, the computing device 204 may be responsible for obtaining aggregated information about the status of various web services. Particularly, the computing device 204 may obtain status information about the web services from the computing device 206, which may host the web services. To access the information used to determine the status of the various web services, the computing device 204 may also obtain security credentials from database 208 (however, the security credentials may also be maintained in any other location, such as computing device 206, etc.).

To decrease the time taken to obtain the security credentials used to access the status information about the web services, the computing device 204 may store the security credentials within cache 215. Cache 215 may be a high-speed data storage layer that stores a subset of data, typically transient in nature, so that future requests for that data are served up faster than is possible by accessing the data's primary storage location. For example, the cache 215 may be within random-access memory (RAM) of the computing device 204, however, the cache 215 may also be within any other type of memory.

By partitioning the security credentials in cache 215, the system 200 may separate when the security credentials are refreshed (e.g., the database 208) and when they are used (e.g., the cache 215). That is, rather than the computing device 204 being required to access the security credentials from the source at which they are periodically refreshed (for example, database 208) every time the computing device 204 accesses the information about the web services, the computing device 204 may more quickly obtain the security credentials from the partitions in the cache 215. Then, when the security credentials are refreshed and the security credentials stored within the cache 215 need to be updated, the computing device 204 may obtain the updated security credentials from the original source (the database 208, for example) and replace the existing security credentials in the cache 215.

Using the cache 215 to store the security credentials may provide a technical benefit that allows for the large aggregated collection of web services to be monitored in a centralized manner. This otherwise may not be feasible given that the frequency at which security credentials may be obtained by the computing device 204 from the original source at which the security credentials are maintained (e.g., the database 208) may be less than the frequency at which it is desired for status information to be obtained about the status of the web services. For example, it may be desired for the computing device 204 to obtain status information multiple times a minute, but it may take multiple minutes for the computing device 204 to obtain the security credentials from the database 208 if they are not stored in the cache 215.

Further, if a failure occurs in the original source from which the security credentials are obtained (e.g., the database 208) the cached security credentials may instead be used to access the web services. This provides for a system that is even more fault tolerant to network issues or otherwise outages in the security credentials source.

Within the cache 215 may be formed one or more partitions (such as, for example, partition 210, partition 212, and partition 214, as well as any other number of partitions). The partitions 210-214 may be the same as, or similar to, the partitions 108-112 depicted in the use case 100 of FIG. 1. Individual partitions may store multiple sets of security credentials. For example, the first partition 210 is shown as including first security credentials 216, second security credentials 218, and third security credentials 220.

In one or more embodiments, the computing device 204 may randomize the partitions into which the security credentials are stored, rather than providing security credentials for a single web service or multiple related web services. This mitigates the impact of a fault of a given partition on the ability of the computing device 204 to obtain status information about related web services. That is, if a fault occurs with one of the partitions, the computing device 204 may not necessarily lose access to security credentials for an entire web service or collection of related web services. However, the computing device 204 is not necessarily limited to the random assignment of security credentials to the partitions.

In one or more embodiments, the computing device 204 may also leverage artificial intelligence 205 to identify web services hosted on the computing device 206 to monitor and obtain status information about the web services. In some instances, the artificial intelligence may 205 automatically perform these functions based on the automated opt-in and opt-out functionality described with respect to FIGS. 3-4.

The computing device 206 may host the various web services that are monitored by the computing device 204. The status information that is presented to the user 203 may be based on alarms that are established to track various metrics associated with the web services. For example, an alarm may be established that may provide an indication when a particular metric associated with a web service satisfies a condition. An example of satisfying a condition may include the metric surpassing a defined threshold. The threshold may be user defined (for example, by a user managing the web service) or may automatically be determined.

The alarms may also be based on more complex conditions as well. For example, a metric alarm can be set for web service when the CPU utilization is over 60% for three periods of five minutes. The alarms may also be based on multiple conditions. For example, a composite alarm can be set for when the CPU utilization is over 60% and disk write bytes operations are over 2000 for three periods of five minutes.

In one or more embodiments, the status information that is presented (for example, via a user interface that a user 203 may access through a user device 202) may include the information about the status of the alarms associated with the various web services. However, the status information may also include a status that is generated based on the alarms. For example, if a threshold associated with an alarm for a particular web service is surpassed, then the status information that is presented may indicate that there is an issue with the web service. As another example, the status information may indicate that there is an issue with the web service if a threshold number of alarms indicate issues with the web service and/or if the alarms have indicated such issues for more than a given period of time. However, the status information may also provide any other types of information, including more granular information as well.

In one or more embodiments, the computing device 204 and the computing device 206 may be servers, for example, however, the computing device 204 and computing device 206 may also be any other type of device or system as well In one or more embodiments, any of the elements of the system 200 (for example, one or more mobile devices 202, one or more computing devices 204, 206, and 216, one or more databases 208, and/or any other element described with respect to FIG. 200 or otherwise) may be configured to communicate via a communications network 250. The communications network 250 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 250 may have any suitable communication range associated therewith and may include, for example, global networks (e.g., the Internet), metropolitan area networks (MANs), wide area networks (WANs), local area networks (LANs), or personal area networks (PANs). In addition, communications network 250 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements of the system 200 may include any of the elements of the computing device 600 as well. For example, one or more processors 602, memory 604, etc.

Figure 3:
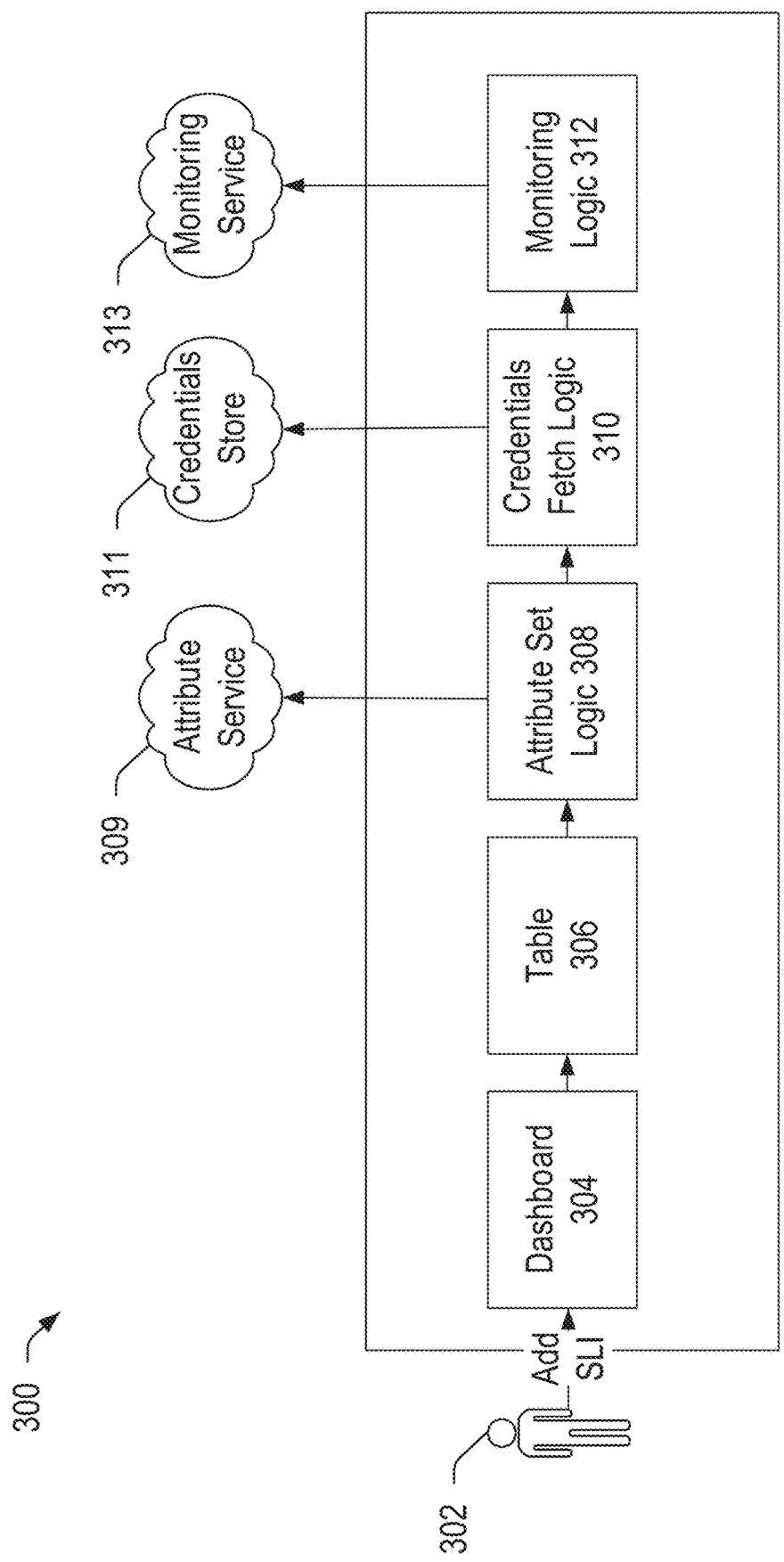
FIG. 3 depicts an example flow diagram for automatic opt-in of web services tracking in accordance with one or more example embodiments of the disclosure.
Figure 4:
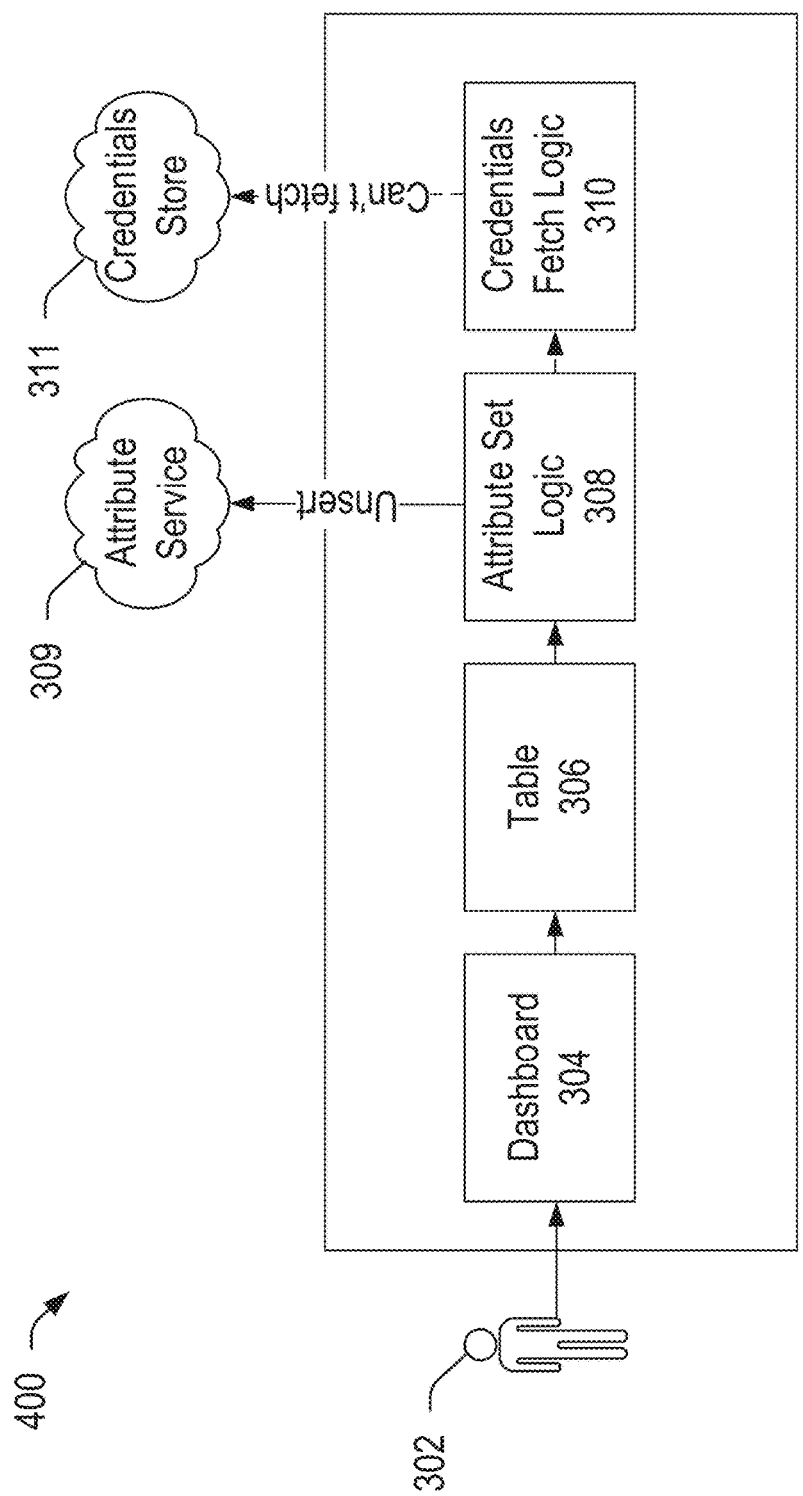
FIG. 4 depicts an example flow diagram for automatic opt-out of web services tracking in accordance with one or more example embodiments of the disclosure.

FIGS. 3-4 depict example flow diagrams for automatic opt-in of web services tracking (flow diagram 300 of FIG. 3) and automatic opt-out of web services tracking (flow diagram 400 of FIG. 4).

Beginning with FIG. 3, a flow diagram 300 associated with the automated opt-in of web service monitoring is shown. At operation 304, a user 302 may access a dashboard 304 associated with a particular web service. For example, the user 302 may access a user interface through a user device. Through the dashboard, the user 302 may be able to view information about the web service, interact with the web service, and/or perform any other functionality associated with the web service.

Through the user interface, the user 302 may establish one or more alarms for the web service by adding them to the dashboard. Alarms may be established to track various metrics associated with the web services. For example, an alarm may be established that may provide an indication when a particular metric associated with a web service satisfies a condition. An example of satisfying a condition may include the metric surpassing a defined threshold. The threshold may be user-defined (for example, by a user managing the web service) or may automatically be determined.

A user may add an alarm to the dashboard through any suitable mechanism. For example, a user may add a string to a field within the dashboard, may select various types of alarms and/or conditions from a drop down box or through selectable icons, and/or may generate the alarms in any other suitable manner. In one or more embodiments, once an alarm is generated, a string including information regarding the alarm may be added to the dashboard. The information about the alarm may also be stored in any other format other than a string as well.

At operation 306, artificial intelligence associated with the centralized computing device (for example, artificial intelligence 205 and computing device 204) may detect that the one or more alarms were established by the user 302. In embodiments, this may specifically involve the artificial intelligence detecting that the one or more strings associated with the alarms have been added by the user 302. In some instances, the artificial intelligence may be configured to detect a particular string format that is associated with alarms.

Based on the existence of these one or more alarms, the artificial intelligence may determine that the web service is enabled for status information monitoring. In embodiments, the web service may be added to a table that includes indications of web services that are enabled for status information monitoring.

At operation 308, attribute logic may access an attribute service 309 to enable the capability to fetch security credentials. For example, enabling the capability to fetch security credentials may involve turning on permissions that allow for the security credentials to be fetched. In some instances, these permissions may remain enabled until the alarms are removed from the dashboard. The attribute service 309 may cause permissions to be more scoped, and thus the system more secure, since the difficulty of "privilege escalation" may be increased. This process is automated end and separates the entity that indicate that credentials may be fetched for a web service and the entity that actually fetches the credentials for the web service.

At operation 310, the security credentials associated with the enabled web services may be obtained from a credentials store 311 (for example, database 106, database 208, etc.). The security credentials may then be stored within cache of the centralized computing device. At operation 312, status information may be obtained from the enabled web services using a monitoring service 313 (for example, the centralized computing device).

Turning to FIG. 4, a flow diagram 400 is shown for auto opt-out of web services tracking. The automatic opt-out may be performed when the user 302 removes the one or more alarms from the dashboard associated with the web service. For example, the strings associated with the one or more alarms may be deleted such that the alarms are no longer present and associated with the web service. When the one or more alarms are removed, the artificial intelligence associated with the centralized system may identify that the one or more alarms are removed and may automatically remove the web service from the listing of web services that are monitored. Thus, the user 302 may not be required to manually indicate to the centralized system that the web service should no longer be monitored for status information.

Figure 5:
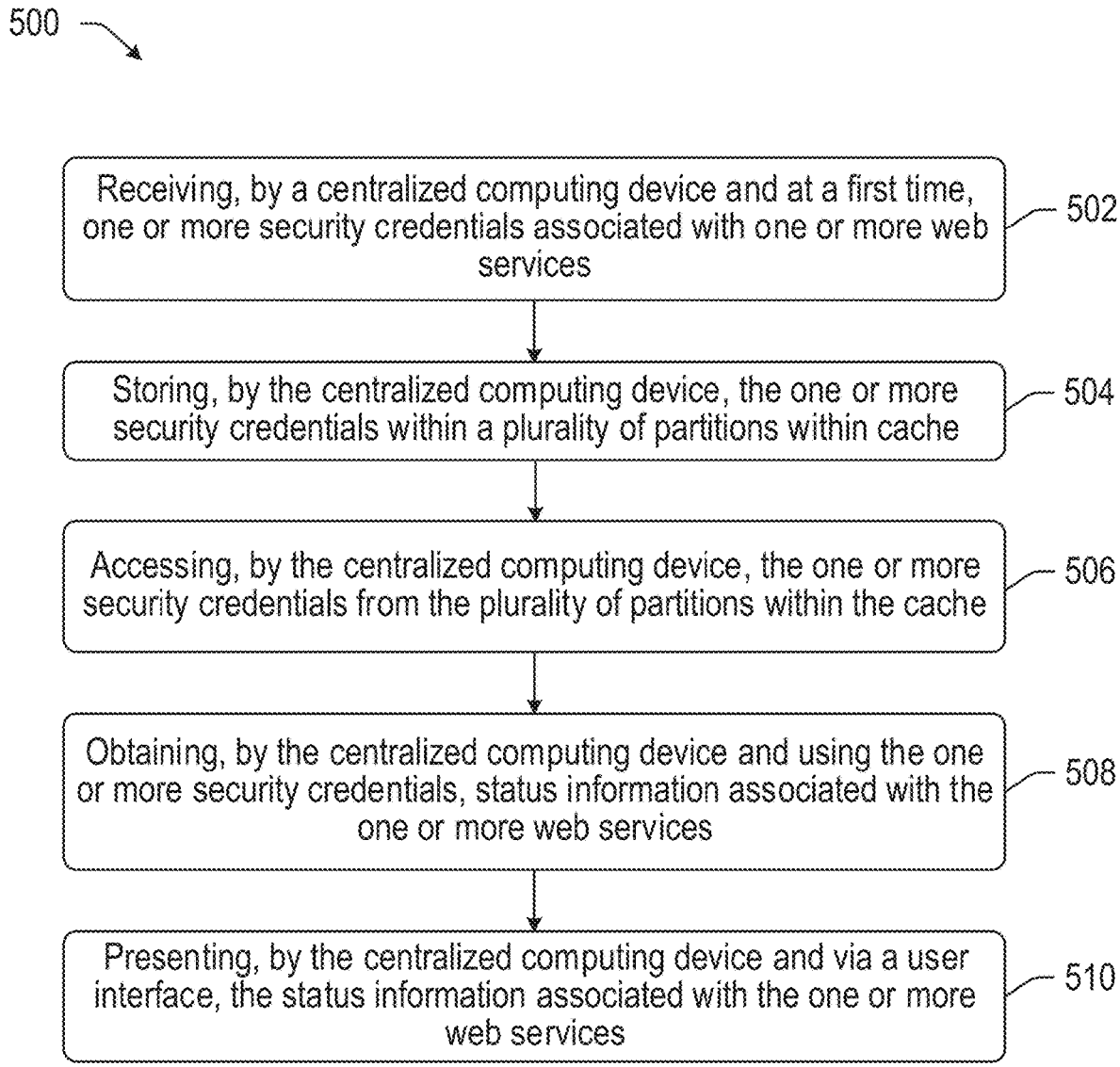
FIG. 5 depicts an example method for using multiple partitions for aggregated tracking of web services in accordance with one or more example embodiments of the disclosure.

FIG. 5 depicts an example method for using multiple partitions for aggregated tracking of web services. Some or all of the blocks of the process flows or methods in this disclosure may be performed in a distributed manner across any number of devices or systems (for example, computing devices 104, 106, 204, 206, 600, and/or any other device or system as described herein). The operations of the method 200 may be optional and may be performed in a different order.

At block 502 of the method 500, computer-executable instructions stored on a memory of a system or device, such as computing devices 104, 106, 204, 206, etc., may be executed to receive, at a first time, one or more security credentials associated with one or more web services. Particularly, a centralized computing device, such as centralized computing device 104, computing device 204, etc. may retrieve security credentials associated with the web services from a database at which the security credentials are maintained.

At block 504 of the method 500, computer-executable instructions stored on a memory of a system or device may be executed to store the one or more security credentials within a plurality of partitions within cache. That is, the security credentials that are retrieved by the centralized computing system may be stored in the cache of the centralized computing system such that the centralized computing system may then access the security credentials at a faster rate than if the centralized computing system were to access the security credentials from the database in which they are maintained at every use. That is, it may normally take several minutes to obtain an aggregated group of security credentials for various web services from the database. However, it may be desirable to obtain status information about the web services from the computing device at a faster rate (such as several times per minute). By storing the security credentials in the cache, the centralized computing device is able to obtain status information about the web services at this faster rate while maintaining the security of the web services.

At block 506 of the method 500, computer-executable instructions stored on a memory of a system or device may be executed to access the one or more security credentials from the plurality of partitions within the cache. At block 508 of the method 500, computer-executable instructions stored on a memory of a system or device may be executed to receive, using the one or more security credentials, status information associated with the one or more web services.

At block 510 of the method 500, computer-executable instructions stored on a memory of a system or device may be executed to present, via a user interface, the status information associated with the one or more web services.

Figure 6:
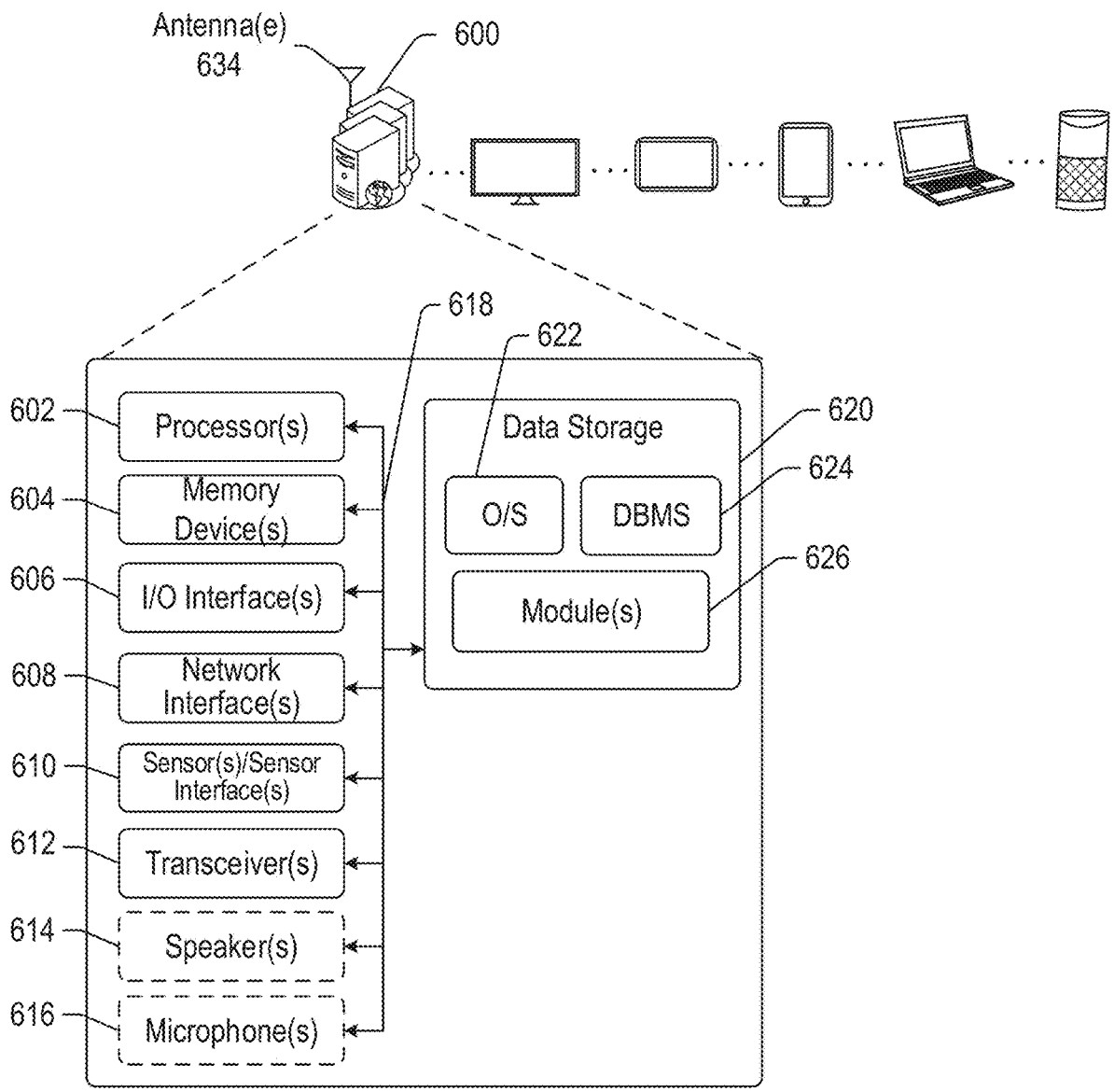
FIG. 6 depicts an example computing device in accordance with one or more example embodiments of the disclosure.

FIG. 6 is a schematic block diagram of an illustrative computing device 600 in accordance with one or more example embodiments of the disclosure. The computing device 600 may include, for example, computing devices 104, 106, 204, 206, 216, and/or any other device or system as described herein.

The computing device 600 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The computing device 600 may further include one or more buses 618 that functionally couple various components of the computing device 600. The computing device 600 may further include one or more antenna (e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the computing device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the computing device 600 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 604 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 620 may include removable storage and/or nonremovable storage including, but not limited to, magnetic storage, optical disk storage, and/or tape storage. The data storage 620 may provide nonvolatile storage of computer-executable instructions and other data. The memory 604 and the data storage 620, removable and/or nonremovable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 620 for nonvolatile storage.

More specifically, the data storage 620 may store one or more operating systems (O/S) 622; one or more database management systems (DBMS) 624; and one or more program module(s), applications, engines, computer-executable code, scripts, or the like such as, for example, one or more module(s) 626. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the computing device 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, purchase history information, user action information, user profile information, a database linking search queries and user actions, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the computing device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the module(s) 626 may include computer-executable instructions, code, or the like that responsive to execution by one or more of the processor(s) 602 may perform functions including, but not limited to, performing time synchronization, player identification and tracking, and/or any other processing described herein or otherwise.

Referring now to other illustrative components depicted as being stored in the data storage 620, the O/S 622 may be loaded from the data storage 620 into the memory 604 and may provide an interface between other application software executing on the computing device 600 and hardware resources of the computing device 600. More specifically, the O/S 622 may include a set of computer-executable instructions for managing hardware resources of the computing device 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 600 is a mobile device, the DBMS 624 may be any suitable light-weight DBMS optimized for performance on a mobile device.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna (e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 600 may further include one or more network interface(s) 608 via which the computing device 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna (e) 634 may include any suitable type of antenna depending, for example, on the communications protocols used to transmit or receive signals via the antenna (e) 634. Non-limiting examples of suitable antennas may include directional antennas, nondirectional antennas, dipole antennas, folded dipole antennas, patch antennas, multiple-input multiple-output (MIMO) antennas, or the like. The antenna (e) 634 may be communicatively coupled to one or more transceivers 612 or radio components to which or from which signals may be transmitted or received.

As previously described, the antenna (e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 634 may be configured to transmit or receive radio frequency signals within any suitable frequency range forming part of the unlicensed portion of the radio spectrum.

The antenna (e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for-in cooperation with the antenna (e) 634—transmitting or receiving radio frequency (RF) signals in the bandwidth and/or channels corresponding to the communications protocols utilized by the computing device 600 to communicate with other devices. The transceiver(s) 612 may include hardware, software, and/or firmware for modulating, transmitting, or receiving—potentially in cooperation with any of antenna (e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computing device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computing device 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by a centralized computing device and at a first time, one or more security credentials associated with one or more web services;
storing, by the centralized computing device, the one or more security credentials within a plurality of partitions within cache by randomly distributing the one or more security credentials across the plurality of partitions within the cache;
accessing, by the centralized computing device, the one or more security credentials from the plurality of partitions within the cache;
obtaining, by the centralized computing device and using the one or more security credentials, status information associated with the one or more web services;
presenting, by the centralized computing device and via a user interface, the status information associated with the one or more web services;
receiving, by the centralized computing device and at a second time, updated security credentials associated with one or more web services; and
storing, by the centralized computing device, the updated security credentials within the plurality of partitions within the cache, wherein the updated security credentials are received at a first frequency, wherein receiving the status information is performed at a second frequency that is greater than the first frequency.

2. The method of claim 1, further comprising:
receiving an indication that an alarm is established for the first web service, wherein the alarm provides an indication when a metric satisfies a condition, and wherein obtaining the status information associated with the one or more web services is automatically performed based on the indication that the alarm is established.

3. The method of claim 2, further comprising:
receiving an indication that the alarm is removed for the first web service, and wherein the centralized system ceases to obtain status information from the first web service based on the alarm being removed.

4. The method of claim 3, wherein receiving the indication that the alarm is established further includes determining that a string is added to an account associated with the first web service, and wherein receiving an indication that the alarm is removed further includes determining that the string is removed from the account.

5. A method comprising:
receiving, by a centralized computing device and at a first time, one or more security credentials associated with one or more web services;
storing, by the centralized computing device, the one or more security credentials within a plurality of partitions within cache;
accessing, by the centralized computing device, the one or more security credentials from the plurality of partitions within the cache;
obtaining, by the centralized computing device and using the one or more security credentials, status information associated with the one or more web services; and
presenting, by the centralized computing device and via a user interface, the status information associated with the one or more web services.

6. The method of claim 5, wherein storing the one or more security credentials within the plurality of partitions further comprises randomly distributing the one or more security credentials across the plurality of partitions within the cache.

7. The method of claim 6, wherein a first security credential of the one or more security credentials associated with a first web service of the one or more web services is stored within a first partition and a second security credential of the one or more security credentials associated with a second web service of the one or more web services is stored within a second partition.

8. The method of claim 5, further comprising:
receiving, by the centralized computing device and at a second time, updated security credentials associated with one or more web services; and
storing, by the centralized computing device, the updated security credentials within the plurality of partitions within the cache, wherein the updated security credentials are received at a first frequency.

9. The method of claim 8, wherein receiving the status information is performed at a second frequency that is greater than the first frequency.

10. The method of claim 5, further comprising:
receiving an indication that an alarm is established for the first web service, wherein the alarm provides an indication when a metric satisfies a condition, and wherein obtaining the status information associated with the one or more web services is automatically performed based on the indication that the alarm is established.

11. The method of claim 10, further comprising:
receiving an indication that the alarm is removed for the first web service, and wherein the centralized system ceases to obtain status information from the first web service based on the alarm being removed.

12. The method of claim 11, wherein receiving the indication that the alarm is established further includes determining that a string is added to an account associated with the first web service, and wherein receiving an indication that the alarm is removed further includes determining that the string is removed from the account.

13. A system comprising:
memory that stores computer-executable instructions; and
one or more processors configured to access the memory and execute the computer-executable instructions to:
receive, at a first time, one or more security credentials associated with one or more web services;
store the one or more security credentials within a plurality of partitions within cache;
access the one or more security credentials from the plurality of partitions within the cache;
obtain, using the one or more security credentials, status information associated with the one or more web services; and
present, via a user interface, the status information associated with the one or more web services.

14. The system of claim 13, wherein storing the one or more security credentials within the plurality of partitions further comprises randomly distributing the one or more security credentials across the plurality of partitions within the cache.

15. The system of claim 14, wherein a first security credential of the one or more security credentials associated with a first web service of the one or more web services is stored within a first partition and a second security credential of the one or more security credentials associated with a second web service of the one or more web services is stored within a second partition.

16. The system of claim 13, wherein the one or more processors are further configured to execute the computer-executable instructions to:
receive, at a second time, updated security credentials associated with one or more web services; and
store the updated security credentials within the plurality of partitions within the cache, wherein the updated security credentials are received at a first frequency.

17. The system of claim 16, wherein receiving the status information is performed at a second frequency that is greater than the first frequency.

18. The system of claim 13, wherein the one or more processors are further configured to execute the computer-executable instructions to:
receive an indication that an alarm is established for the first web service, wherein the alarm provides an indication when a metric satisfies a condition, and wherein obtaining the status information associated with the one or more web services is automatically performed based on the indication that the alarm is established.

19. The system of claim 18, further comprising:
receive an indication that the alarm is removed for the first web service, and wherein the centralized system ceases to obtain status information from the first web service based on the alarm being removed.

20. The system of claim 19, wherein receiving the indication that the alarm is established further includes determining that a string is added to an account associated with the first web service, and wherein receiving an indication that the alarm is removed further includes determining that the string is removed from the account.

* * * * *